Nov. 30, 1937.      A. F. MOYER      2,100,910
GANG LAWN MOWER
Filed Nov. 23, 1936      4 Sheets-Sheet 3
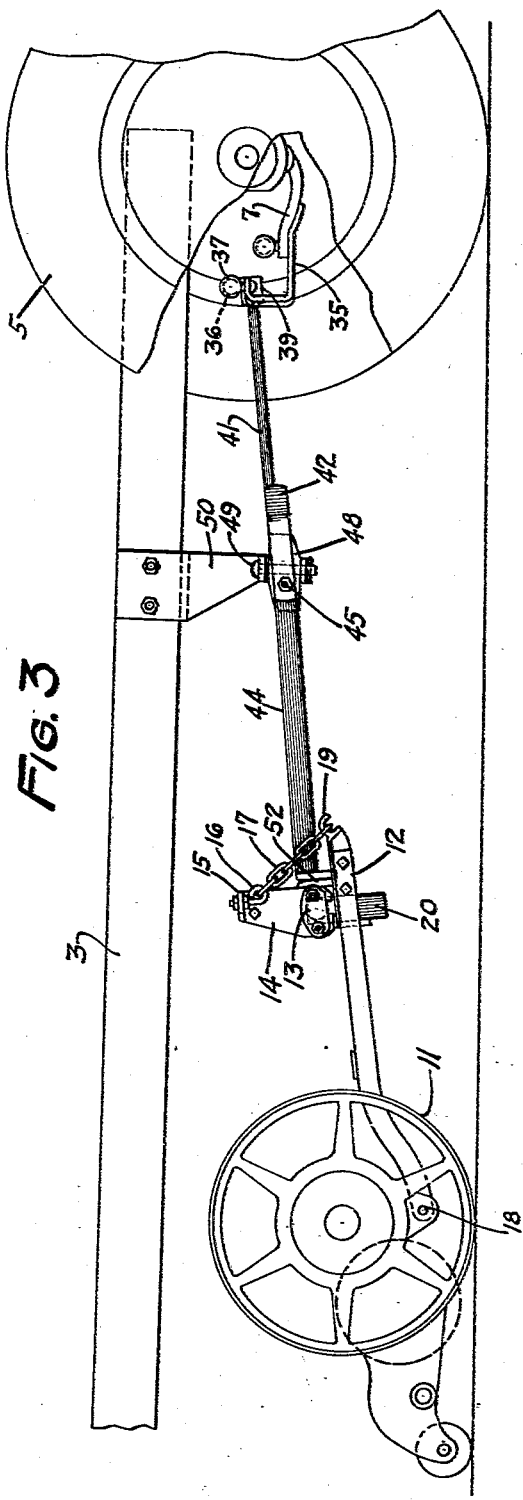
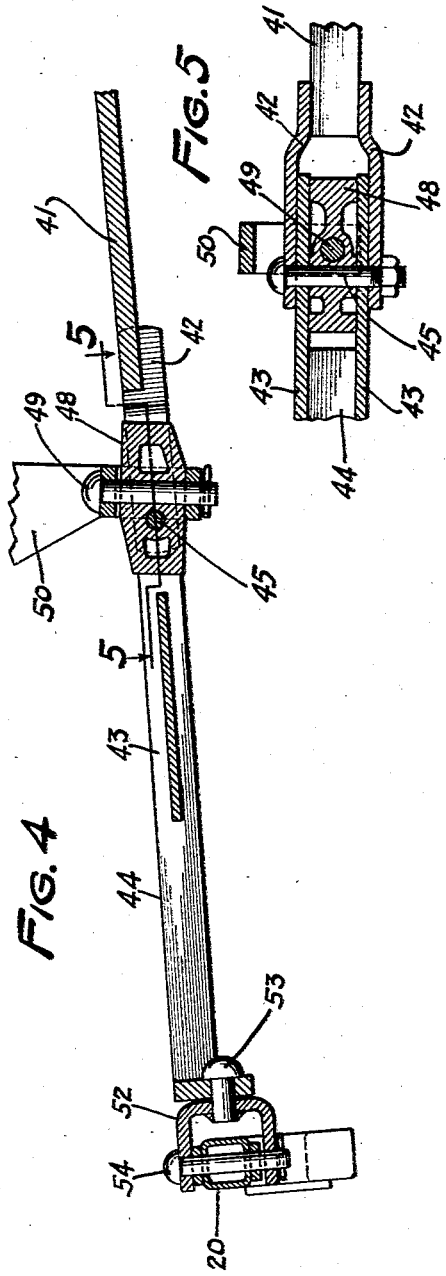
Inventor
AMOS F. MOYER
ATTORNEYS

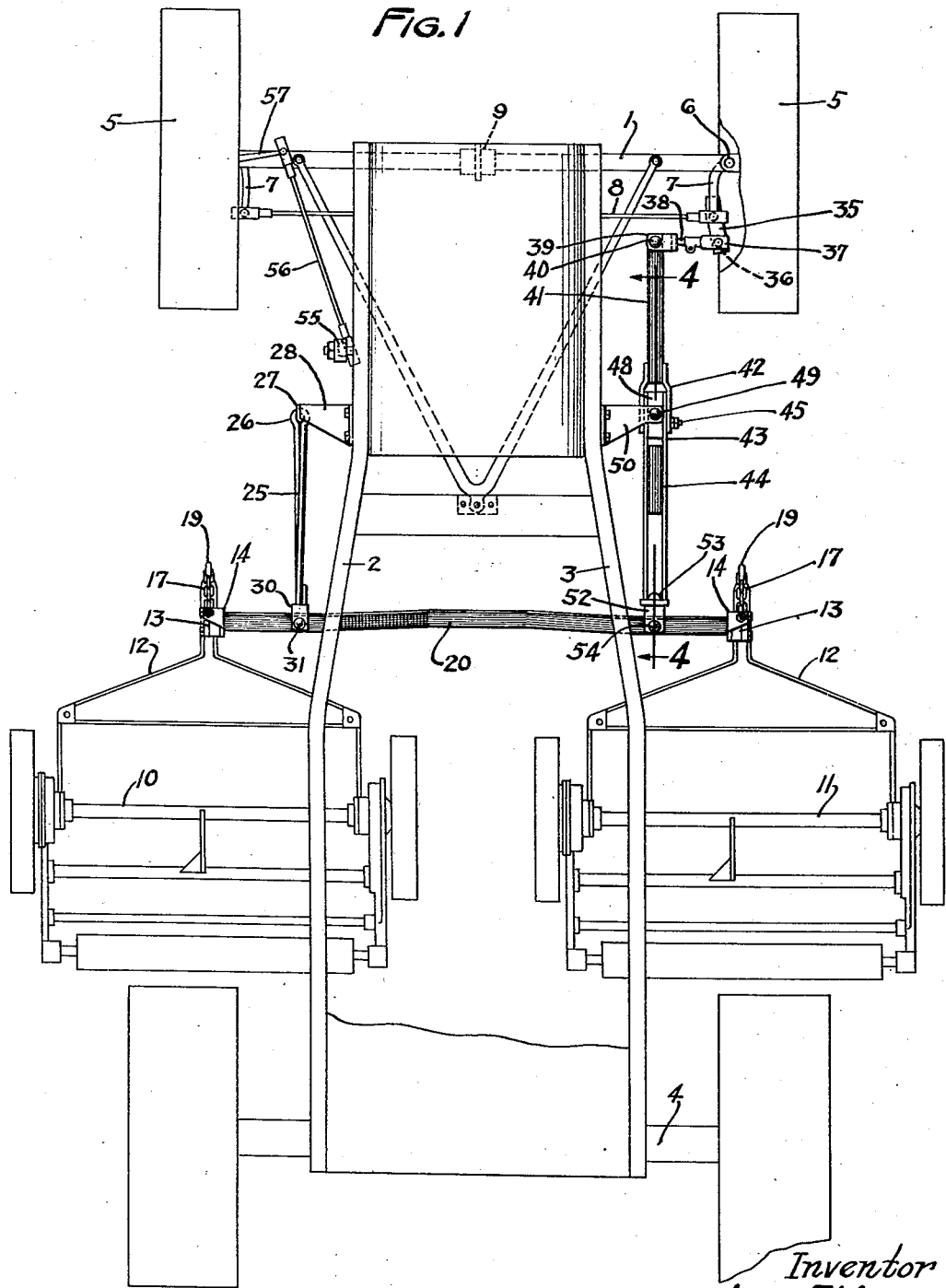

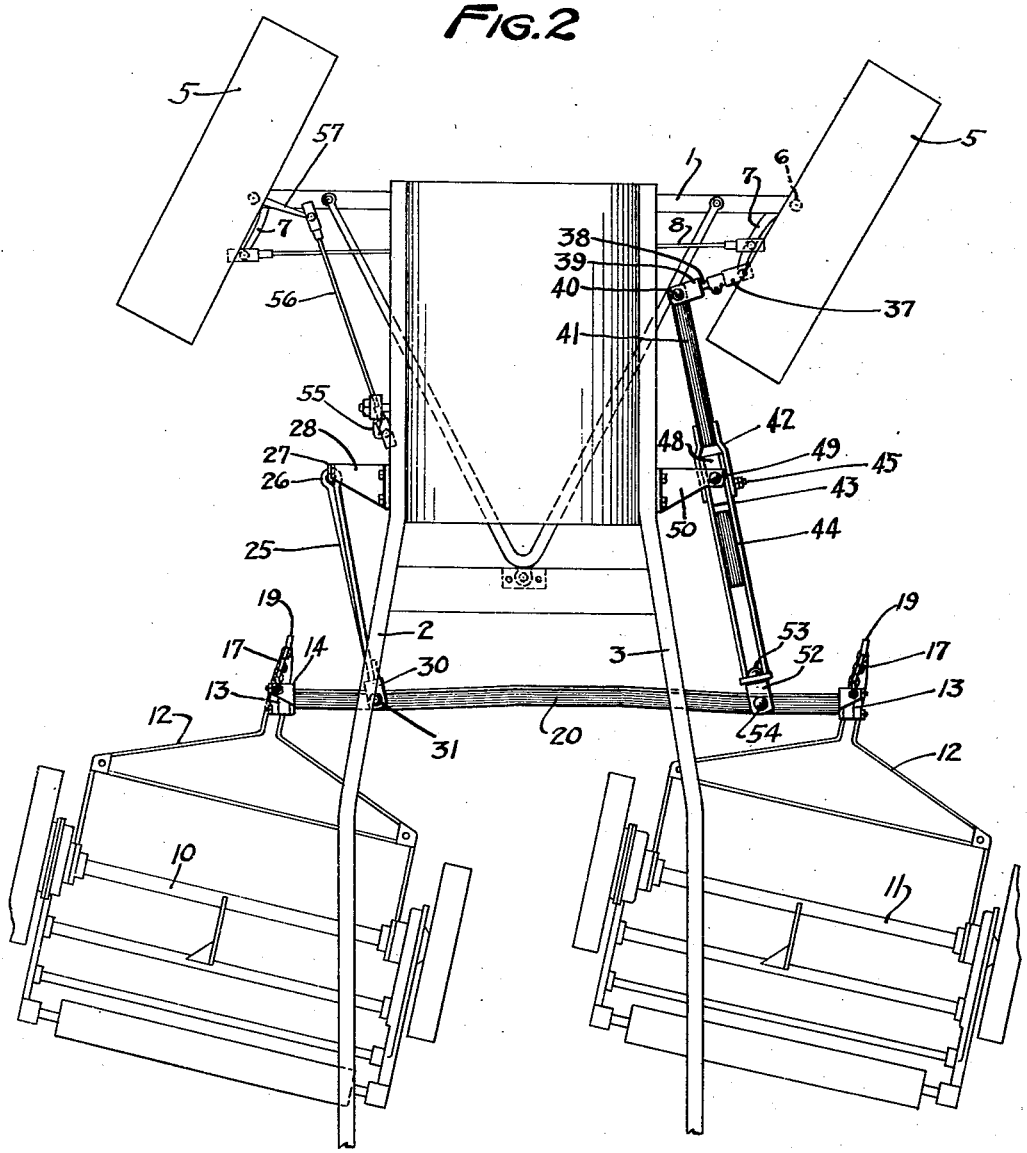

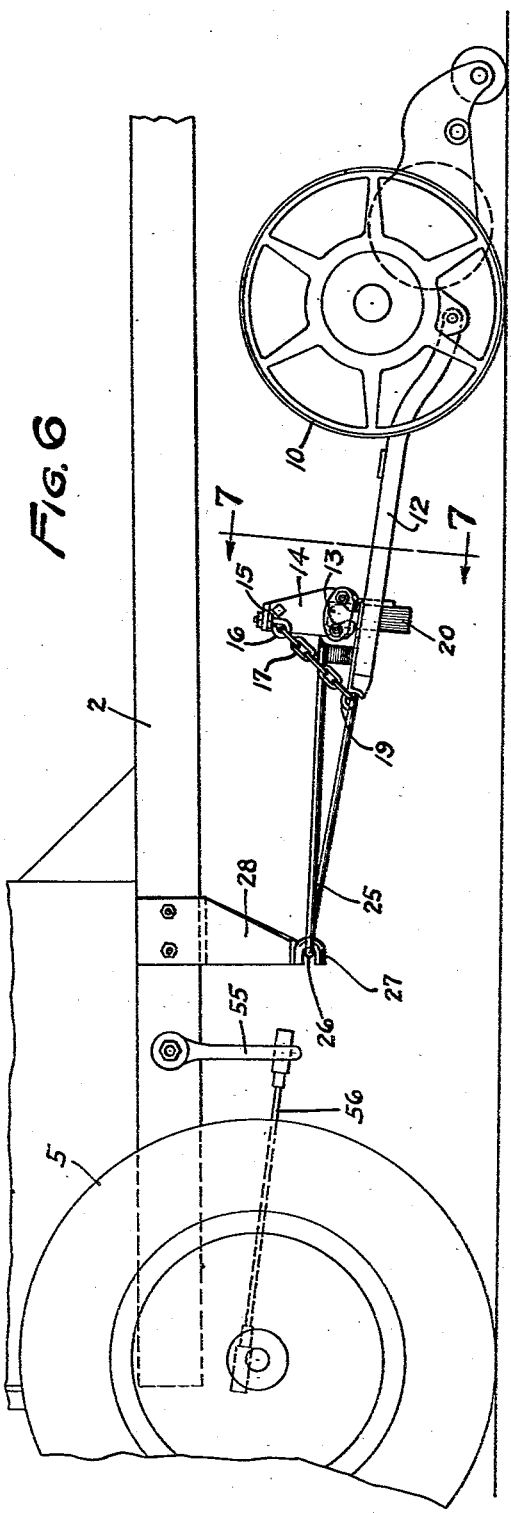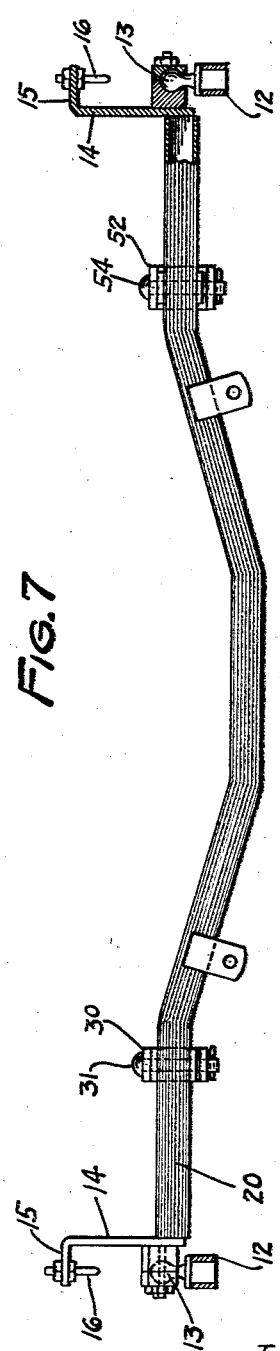

Patented Nov. 30, 1937

2,100,910

UNITED STATES PATENT OFFICE 2,100,910

GANG LAWN MOWER

Amos F. Moyer, Minneapolis, Minn., assignor to Toro Manufacturing Corporation of Minnesota, Minneapolis, Minn., a corporation of Minnesota Application November 23, 1936, Serial No. 112,188

11 Claims. (Cl. 56—7)

This invention relates to improvements in gang lawn mowers, and is an improvement over certain constructions shown in my Patent 2,067,158 for Power gang lawn mower.

The improvement herein relates particularly to means for shifting certain of the mower units to facilitate steering, the shifting being controlled by the steering mechanism of a tractor, or other suitable wheeled vehicle. In the earlier case the units were attached to a shift bar which was shiftably mounted directly on the frame of the vehicle, so as to follow vertical motions of the vehicle. While this shift bar arrangement is adequate and highly useful under certain conditions, it has certain objections, for other uses, in that operation is not as smooth as it should be when the mowers are operating over sharp undulations of the ground. The reason is that the draw bar hitch points of the units or mowers are fixed against vertical motions relatively to the frame of the vehicle, that is, are carried at a fixed distance below the tractor frame, in vertical immovable relation to the frame. When the gang passes over a sharp ridge or over the shoulder of a terrace the draw bars of the mowers were sometimes forced into the ground. At other times when passing over a hollow or operating at the bottom of a terrace the unit and draw bar hitch points were carried to such heights as to exert a considerable lifting force on the front units, and cause them to lose traction and cut improperly. When passing over a ridge the spring which, in the structures of the aforesaid application, connects the arm of the front end of the unit draw bar, was expanded, and when passing through a hollow the spring was contracted.

In the present construction a non-extensible chain or other functionally equivalent device is used in lieu of the spring of the earlier construction, and the shift bar is supported for vertical movement independently of the vehicle, and partially upon the units, to move up and down with them, instead of being directly supported on the vehicle in fixed relation and therefore incapable of following the units vertically. As will more fully appear below the shift bar is mounted on the mowing units at the front of the unit draw bars and is supported both partially in vertical position, and for sustaining the draft forces directly from the chassis frame of the vehicle.

Features of the invention include all details of construction relating to the mounting of the shift bar its connections with the frame, and the means by which the bar is shifted through connections with the steering mechanism of the tractor having independent vertical motions, along with the broader ideas of means inherent of this disclosure.

Objects, features and advantages of the invention will appear in the description of the drawings, and in said drawings:

Figure 1 is a plan view, showing the invention applied to a wheeled vehicle and controlling two mowing units;

Figure 2 is a view somewhat similar to Figure 1, illustrating shifting of the mowers conformably to change in steering direction;

Figure 3 is a side elevation with the front tractor wheel broken away to show the connection with the steering knuckle;

Figure 4 is a vertical longitudinal section on line 4—4 of Figure 1 illustrating the shift-lever, and shift-bar linking construction;

Figure 5 is a plan section on line 5—5 of Figure 4 illustrating the pivoting scheme;

Figure 6 is a side elevation similar to Figure 3, but viewed from the opposite side of the vehicle; and Figure 7 is a vertical section taken on line 7—7 of Figure 6 illustrating the shift bar structure means by which it is connected to the units.

In the drawings, numerals 2 and 3 indicate the side rails of the chassis of a tractor. Numeral 1 indicates the front axle; numeral 4 the rear axle. Numerals 5 indicate the front wheels which are pivoted as at 6 to the axle 1, and each wheel is provided with the usual knuckle 7, and the knuckles are connected by the usual steering rod 8. Numerals 10 and 11 respectively generally indicate mower units of any preferred construction, each provided with a draw bar 12. On some tractors the front axle is pivoted to the frame, on a horizontal axis extending lengthwise of the vehicle, as generally indicated at 9.

Referring to Figures 6 and 7, each unit draw bar has near its front end, a ball and socket joint or universal joint of well known construction, which is generally indicated at 13. By means of this joint and pivotal connections 18, the units are adapted to trail and to adjust themselves to the inequalities of the ground. The ball part is secured to the draw bar 12 and the socket part is made integral with an upright member 14 integrally secured to the shift bar 20, and having a horizontal portion 15 provided with a vertically adjustable eye 16 with which a chain 17 or equivalent flexible element is connected. The outer lower end of the chain is linked over a hook 19, arranged as shown at the outer end of the draw bar 12.

The members 14 form part of the shift bar 20 and this bar is supported to swing vertically with the mowers while also supported partially on the vehicle at a position forward of the bar. This shift bar is in this manner partially supported by link connections or equivalent means which entrain the bar, and allow up and down as well as lateral shifting motions thereof.

In this embodiment the link means is in part constituted by the shift-bar shifting means, and although the invention herein is not entirely limited to this scheme, it is a valuable claimed feature. The entraining or link connections between the shift bar and the frame are such as to allow free vertical and lateral shifting motions of the bar. Referring now to Figure 6, one link connection is indicated at 25 and comprises a heavy upper rod bent upon itself to form a closed eye or loop 26 operatively associated with a hook 27 carried by a side bracket 28 of the chassis side member 2. Some other form of universal connection might be substituted. The two arms of link 25 have their rear ends suitably integrally secured to a yoke 30 associated with the shift bar 20. A vertical pin 31 passes through the yoke and shift bar, thus giving a connection at the bar which allows only horizontal swinging. The link 25 therefore becomes part of a bridging connection. Referring to Figure 6, this bridge is formed by elements 12, 13, 14, 17 and 25.

The chains 17 act as a truss member normally preventing downward collapse of the unit draw bar and shift bar, about the ball and socket connection as a center. A further function of the chain and its advantage over a rigid link, is that in case either of the two units is required to pass over a hump, the shift bar will be lifted by this action in view of the fact that both the steering arm and the draft arm are pivoted with yokes on vertical pins in the cross bar. Under this condition the unit at the opposite side, which may not be passing over a hump, will remain on the ground and the chain will momentarily become slack, and cease to perform the trussing function, or to sustain the weight at that side. By vertical adjustment of eye 16, the height at which chains 17 support the shift bar 20 may be regulated, as for example, to compensate for wear on the chain or other connections.

An important feature of the invention is the construction now to be described, and best shown in detail in Figures 1, 3, 4 and 5. Referring first to Figure 3, one of the steering knuckles 7, for example the right hand knuckle, has attached thereto a rearwardly extending bracket 35 having a ball 36. With this ball is operably associated a suitable socket member 37, adjustable on a rod 38, which is integral with a yoke 39, vertically pivoted as at 40 to the forward arm 41 of shifting lever for shift bar 20. The arm 41 has terminal yoke-forming extensions 42 which lie at the outside of and against similar extensions 43 of the rear arm 44 of the shift lever. A horizontal pivot bolt 45 traverses arms 42 and 43 and a block 48. This block is pivoted by a vertical pin 49 to a bracket 50 in turn secured to a frame member 3. The opposite end of the arm 44 is connected to a yoke 52 (see Figure 4) by means of a horizontal pivot 53 extending lengthwise of the arm. The yoke is pivoted to the bar 44 by a vertical pivot 54 as shown. By means of the pivot 45, bar 44 can move vertically conformable to the movements of the shift bar. At the same time by means of connections 26, 30, and 49, 54 (see Figures 1 and 2) the shift bar can move laterally. Pivot 45 is placed slightly rearwardly of the vertical pivot 49 (see Figure 4).

In order that the forward end of the steering arm will not be constrained to oscillate vertically with a motion opposed to that of the unit, when the units are passing over undulations of the ground, the steering lever is pivoted on the horizontal pivot 45. The preferred construction is to have the forward arm 41 of the lever free to oscillate vertically about the horizontal pivot 45. Thus, the front end of the steering arm is free to assume any vertical position corresponding to that of the front wheel knuckle to which it is connected. The knuckle is free to oscillate vertically with respect to the tractor chassis due to ground undulations, because of the pivotal connection 9 of the tractor with the axle at its center with the chassis of the tractor. This connection is rather diagrammatically illustrated in dotted lines in Figure 1. It is a construction well known in this art.

When driving the tractor diagonally over a terrace the front axle will oscillate, and the wheel knuckle will have considerable vertical motion. The connection of this invention allows the vertical motions of both arms of the shift lever, so that the movements of the mowers and shift bar are entirely independent of motions of the front wheels when tipping to conform to the configuration of the surface over which the gang is traveling.

It will be noted that the lateral movements of shift bar 20 occur simultaneously with, and in definite relation to, the steering of the tractor front wheels by the respective knuckles 7. It is common practice that the front axle knuckles of this class of tractor vehicles are guided by a steering arm 55 and drag link 56, usually at the left side as seen in Figures 1 and 2, and pivotally connected to arm 57, which is made fast with, and thereby caused to steer, the particular knuckle 7. The steering column and its connections have not been shown because these structures are well known.

I claim as my invention:

1. In combination with a vehicle having front and rear wheels, and front wheel steering means, mower units arranged between the front and rear wheels, a shift bar supported on said units and means connecting it to the units, means connecting the shift bar to the vehicle for vertical and horizontal motions, and means by which the steering mechanism of the vehicle shifts said bar conformably to change in steering direction.

2. In combination with a vehicle having front and rear wheels, and front wheel steering means, mower units arranged between the front and rear wheels, a shift bar supported on said units and means connecting it to the units, two means entrainingly connecting the shift bar to the vehicle for vertical and horizontal motions, and means by which the steering mechanism of the vehicle shifts said bar conformably to change in steering direction.

3. In combination with a vehicle having front and rear wheels, and front wheel steering means, mower units arranged between the front and rear wheels, a shift bar supported on said units and means connecting it to the units, two means connecting the shift bar to the vehicle for vertical and horizontal motions, and means by which the steering means shifts said bar conformably to change in steering direction, including a forward extension of one of said two connecting means.

4. In combination with a vehicle having front and rear wheels, and front wheel steering means, mower units arranged between the front and rear wheels, a shift bar supported on said units and means connecting it to the units, two means entrainingly connecting the shift bar to the vehicle for vertical and horizontal motions, means by which the steering means shifts said bar conformably to change in steering direction, including a forward extension of one of said two connecting means, and means by which said forward extension can move independently in a vertical plane.

5. In combination with a vehicle having front and rear wheels, and front wheel steering means, mower units arranged between the front and rear wheels, a shift bar supported on said units and means connecting it to the units, two means entrainingly connecting the shift bar with the vehicle respectively from points on the bar which are intermediate of its points of connection with the units for vertical and horizontal motions, and means by which the steering mechanism of the vehicle shifts said bar conformably to change in steering direction.

6. In combination with a vehicle having front and rear wheels and front wheel steering means, mowing units arranged intermediately of the front and rear wheels, a shift bar and means separately pivotally connecting each unit to the bar to allow independent motion of the units relative to the bar in vertical and horizontal directions, two forwardly extending means separately connecting the bar respectively from points intermediately of its points of connection with the units to swing in a vertical plane and to allow the bar to move with and to shift the units, and means by which the steering means shifts said bar, through one of said two connecting means.

7. In combination with a vehicle having front and rear wheels, and front wheel steering means, mowing units arranged intermediately of the front and rear wheels, a shift bar, a pair of transversely spaced draw elements, respectively pivoted by one end to the bar by a vertical pivot, and each pivoted by the opposite end to the vehicle by means allowing vertical and lateral shifting motions of the bar, means separately pivotally connecting each unit to the bar to allow vertical and horizontal motions of the units relatively to the bar, and flexible means connecting each unit to the shift bar to prevent up swing of the mowing portion of the unit relatively to the bar but to permit down swing.

8. In combination with a vehicle having front wheel steering means, a plurality of mower units in one transverse rank, a shift bar, means operably connecting the shift bar to the vehicle, means separately pivotally connecting each unit to the bar to allow the units to follow undulations of the ground and to trail, and means operably connecting the front wheel steering means with the bar for shifting it conformably to change in steering direction, including a lever mounted on the vehicle and having two arms one operably connected with the front wheel steering means, and the other operably connected with the bar to shift it, and plural means pivoting said arms for independent vertical motions, and in a manner to necessitate conjoint lever action of both arms in a horizontal plane.

9. In combination with a vehicle having front wheel steering means, a plurality of mower units in one transverse rank, a shift bar, means operably connecting the shift bar to the vehicle, means separately pivotally connecting each unit to the bar to allow the units to follow undulations of the ground, and to trail, and means operably connecting the front wheel steering means with the bar for shifting it conformably to change in steering direction, including a lever having two arms one connected with the front wheel steering means and the other connected with the bar, a block, a common pivot connecting the arms to the block for independent vertical motions, and means pivoting the block to the vehicle, to swing in a horizontal plane.

10. In combination with a vehicle having front wheel steering means, a plurality of mower units in one transverse rank, a shift bar, plural link means separately operably connecting the shift bar to the vehicle for vertical and horizontal motions, means separately pivotally connecting each unit to the bar to allow the units to follow undulations of the ground and to trail, and means connecting the front wheel steering means with the bar for shifting it conformably to change in steering direction, including a lever as one of the plural link means mounted on the vehicle, said lever having two arms one connected with the front wheel steering means and the other link-connecting with the bar to shift it, means pivoting said arms for independent vertical motions, and in a manner to necessitate conjoint lever action of both arms in a horizontal plane.

11. In combination with a wheeled vehicle having a front wheel steering mechanism, a pair of mower units, a shift bar for the units, means connecting the bar to entrain and shift the units, means connecting the bar to the vehicle for vertical and horizontal motions, and means connecting the steering mechanism with the bar to shift it conformably to change in steering direction, including a lever intermediately pivoted to the vehicle, said lever in part constituting a part of the means connecting the bar to the vehicle.

AMOS F. MOYER.